(12) United States Patent
Uliel et al.

(10) Patent No.: US 9,436,469 B2
(45) Date of Patent: Sep. 6, 2016

(54) METHODS TO OPTIMIZE A PROGRAM LOOP VIA VECTOR INSTRUCTIONS USING A SHUFFLE TABLE AND A MASK STORE TABLE

(75) Inventors: Tal Uliel, Tel Aviv (IL); Elmoustapha Ould-Ahmedvall, Chandler, AZ (US); Bret T. Toll, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 13/976,162

(22) PCT Filed: Dec. 15, 2011

(86) PCT No.: PCT/US2011/065213
§ 371 (c)(1),
(2), (4) Date: Sep. 3, 2013

(87) PCT Pub. No.: WO2013/089749
PCT Pub. Date: Jun. 20, 2013

(65) Prior Publication Data
US 2013/0339682 A1    Dec. 19, 2013

(51) Int. Cl.
*G06F 9/30* (2006.01)
*G06F 9/45* (2006.01)

(52) U.S. Cl.
CPC ............ *G06F 9/30032* (2013.01); *G06F 9/30* (2013.01); *G06F 9/30036* (2013.01)

(58) Field of Classification Search
None
See application file for complete search history.

(56) References Cited

U.S. PATENT DOCUMENTS

| | | | |
|---|---|---|---|
| 5,123,095 A * | 6/1992 | Papadopoulos ..... | G06F 9/30032 708/520 |
| 5,551,039 A * | 8/1996 | Weinberg ............ | G06F 9/30036 712/10 |
| 5,604,913 A * | 2/1997 | Koyanagi et al. ................ | 712/5 |
| 6,016,395 A | 1/2000 | Mohamed | |
| 6,041,404 A | 3/2000 | Roussel et al. | |
| 6,269,435 B1 * | 7/2001 | Dally .................. | G06F 9/30032 345/561 |
| 7,840,859 B2 | 11/2010 | Van Den Bosch | |
| 8,004,921 B2 | 8/2011 | Kawakubo et al. | |

(Continued)

FOREIGN PATENT DOCUMENTS

CN    1132316 C    12/2003
TW    356540    4/1999

OTHER PUBLICATIONS

Willhalm et al., "SIMD-Scan: Ultra Fast in-Memory Table Scan using onChip Vector Processing Units," 2009, VLDB '09, Aug. 24-28, 2009, Lyon, France, pp. 385-394.*
Cho et al., "An FPGA Based SIMD Processor With a Vector Memory Unit," 2006, ISCAS 2006, pp. 525-528.*

(Continued)

*Primary Examiner* — Thuy Dao
*Assistant Examiner* — Stephen Berman
(74) *Attorney, Agent, or Firm* — Nicholson De Vos Webster & Elliott LLP

(57) ABSTRACT

According to one embodiment, a code optimizer is configured to receive first code having a program loop implemented with scalar instructions to store values of a first array to a second array based on values of a third array. The code optimizer is configured to generate second code representing the program loop with vector instructions including a shuffle instruction and a store instruction, the store instruction to shuffle using a shuffle table elements of the first array based on the second array in a vector manner, the store instruction to store using a mask store table the shuffled elements in the third array in a vector manner.

20 Claims, 11 Drawing Sheets

(56) References Cited

U.S. PATENT DOCUMENTS

| | | | |
|---|---|---|---|
| 2003/0070040 A1 | 4/2003 | Sasaki et al. | |
| 2003/0088601 A1* | 5/2003 | Pitsianis | G06F 9/30032 708/622 |
| 2004/0006667 A1 | 1/2004 | Bik et al. | |
| 2004/0054878 A1* | 3/2004 | Debes et al. | 712/221 |
| 2005/0240644 A1* | 10/2005 | Van Berkel et al. | 708/441 |
| 2005/0273770 A1* | 12/2005 | Eichenberger et al. | 717/136 |
| 2005/0283775 A1* | 12/2005 | Eichenberger et al. | 717/151 |
| 2007/0011441 A1* | 1/2007 | Eichenberger | G06F 9/30032 712/221 |
| 2007/0250683 A1* | 10/2007 | Van Hook | G06F 9/30032 712/22 |
| 2008/0065863 A1* | 3/2008 | Eichenberger | G06F 9/30032 712/224 |
| 2008/0141012 A1* | 6/2008 | Yehia et al. | 712/226 |
| 2009/0113185 A1* | 4/2009 | Hansen | G06F 9/30018 712/221 |
| 2009/0249026 A1* | 10/2009 | Smelyanskiy | G06F 9/30032 712/4 |
| 2010/0095097 A1* | 4/2010 | Gschwind | G06F 9/30036 712/222 |
| 2010/0205580 A1* | 8/2010 | McAllister | G06F 8/314 717/106 |
| 2010/0318979 A1* | 12/2010 | Greyzck | G06F 8/443 717/160 |
| 2012/0151156 A1* | 6/2012 | Citron et al. | 711/154 |
| 2012/0254845 A1* | 10/2012 | Yi et al. | 717/144 |
| 2013/0080737 A1* | 3/2013 | Reid | G06F 8/45 712/4 |
| 2013/0297919 A1* | 11/2013 | Kang | G06F 9/30 712/241 |
| 2013/0318511 A1* | 11/2013 | Tian et al. | 717/157 |
| 2014/0189296 A1* | 7/2014 | Ould-Ahmed-Vall | G06F 9/30036 712/22 |
| 2014/0201510 A1* | 7/2014 | Sair | G06F 9/30036 712/241 |

OTHER PUBLICATIONS

Kurzak et al., "Optimizing matrix multiplication for a short-vector SIMD architecture—CELL processor," Parallel Computing 35 (2009), pp. 138-150.*

Maleki et al., "An Evaluation of Vectorizing Compilers," 2011, 2011 International Conference on Parallel Architectures and Compilation Techniques (PACT), pp. 372-382.*

Nuzman et al., "Outer-loop vectorization: revisited for short SIMD architectures," 2008, Proceedings of the 17th international conference on Parallel architectures and compilation techniques, pp. 2-11.*

Barik et al., "Efficient Selection of Vector Instructions Using Dynamic Programming," 2010, Proceedings of the 2010 43rd Annual IEEE/ACM International Symposium on Microarchitecture, pp. 201-212.*

Taiwan Patent Application No. 101142379, Notice of Allowance, Dated Nov. 26, 2014, 3 pages.

International Search Report mailed Jul. 18, 2012, for International Application No. PCT/US2011/065213, 7 pages.

Willhalm, Tomas et al., "SIMD-scan: ultra fast in-memory table scan using on-chip vector processing units," Proceedings of the VLDB Endowment, vol. 2, Issue 1, Aug. 2009.

Melax, Stan, "3D Vector Normalization Using 256-Bit Intel Advanced Vector Extensions (Intel AVX)," Intel, Sep. 27, 2010, retrieved from http://software.intel.com/sites/default/files/m/d/4/1/d/8/normvec.pdf.

International Search Report mailed Aug. 27, 2014, for Taiwan Patent Application No. 101142379 filed Nov. 14, 2012, 5 pages.

PCT Written Opinion of the International Searching Authority for PCT Counterpart Application No. PCT/US2011/065213, 3 pgs., (Jul. 18, 2012).

PCT Notification concerning Transmittal of International Preliminary Report on Patentability (Chapter I of the Patent Cooperation Treaty) for PCT Counterpart Application No. PCT/US2011/065213, 5 pgs., (Jun. 17, 2014).

* cited by examiner

```
int a[];            301
float b[];           303
const float topVal;
int dst[];           302 for (i =0; i < N; i++)
{
    if (topVal > b[i])        304
    {
        *dst = a[i];           305
        dst++;                 306
    }
}
```

```
vmm0 = broadcast (topVal);              —401
for (i = 0; i < N; i += VL)             —402
{
    vmm2 = cmpgt(vmm0, load b[i:i+VL]);         —403
    mask = extract_sign_bits(vmm2);             —404
    vmm1 = load (shuffleTable[mask:mask+VL]);   —405
    vmm2 = shuffle (vmm1, load (a[i:i+VL]));    —406
    num = popcnt(mask);                         —407
    vmm1 = load(maskStoreTable[4-num*4]);       —408
    maskstore (dst, vmm2, vmm1);                —409
    dst+=num;                                   —410
}
```

```
__declspec(align(16)) const char shuffleTable[16*16] =    ~501
{
0x80, 0x80, 0x80, 0x80, 0x80, 0x80, 0x80, 0x80, 0x80, 0x80, 0x80, 0x80, 0x80, 0x80, 0x80, 0x80,
0x00, 0x01, 0x02, 0x03, 0x80, 0x80, 0x80, 0x80, 0x80, 0x80, 0x80, 0x80, 0x80, 0x80, 0x80, 0x80,
0x04, 0x05, 0x06, 0x07, 0x80, 0x80, 0x80, 0x80, 0x80, 0x80, 0x80, 0x80, 0x80, 0x80, 0x80, 0x80,
0x00, 0x01, 0x02, 0x03, 0x04, 0x05, 0x06, 0x07, 0x80, 0x80, 0x80, 0x80, 0x80, 0x80, 0x80, 0x80,
0x08, 0x09, 0x0a, 0x0b, 0x80, 0x80, 0x80, 0x80, 0x80, 0x80, 0x80, 0x80, 0x80, 0x80, 0x80, 0x80,
0x00, 0x01, 0x02, 0x03, 0x08, 0x09, 0x0a, 0x0b, 0x80, 0x80, 0x80, 0x80, 0x80, 0x80, 0x80, 0x80,
0x04, 0x05, 0x06, 0x07, 0x08, 0x09, 0x0a, 0x0b, 0x80, 0x80, 0x80, 0x80, 0x80, 0x80, 0x80, 0x80,
0x00, 0x01, 0x02, 0x03, 0x04, 0x05, 0x06, 0x07, 0x08, 0x09, 0x0a, 0x0b, 0x80, 0x80, 0x80, 0x80,
0x0c, 0x0d, 0x0e, 0x0f, 0x80, 0x80, 0x80, 0x80, 0x80, 0x80, 0x80, 0x80, 0x80, 0x80, 0x80, 0x80,
0x00, 0x01, 0x02, 0x03, 0x0c, 0x0d, 0x0e, 0x0f, 0x80, 0x80, 0x80, 0x80, 0x80, 0x80, 0x80, 0x80,
0x04, 0x05, 0x06, 0x07, 0x0c, 0x0d, 0x0e, 0x0f, 0x80, 0x80, 0x80, 0x80, 0x80, 0x80, 0x80, 0x80,
0x00, 0x01, 0x02, 0x03, 0x04, 0x05, 0x06, 0x07, 0x0c, 0x0d, 0x0e, 0x0f, 0x80, 0x80, 0x80, 0x80,
0x08, 0x09, 0x0a, 0x0b, 0x0c, 0x0d, 0x0e, 0x0f, 0x80, 0x80, 0x80, 0x80, 0x80, 0x80, 0x80, 0x80,
0x00, 0x01, 0x02, 0x03, 0x08, 0x09, 0x0a, 0x0b, 0x0c, 0x0d, 0x0e, 0x0f, 0x80, 0x80, 0x80, 0x80,
0x04, 0x05, 0x06, 0x07, 0x08, 0x09, 0x0a, 0x0b, 0x0c, 0x0d, 0x0e, 0x0f, 0x80, 0x80, 0x80, 0x80,
0x00, 0x01, 0x02, 0x03, 0x04, 0x05, 0x06, 0x07, 0x08, 0x09, 0x0a, 0x0b, 0x0c, 0x0d, 0x0e, 0x0f
};

__declspec(align(16)) const int maskStoreTable[8] = { -1, -1, -1, -1, 0, 0, 0, 0 };    ~502
```

FIG. 5

```
vmm0 = broadcast (topVal);
numOfElem = 0;
vmm2= xor(vmm1, vmm1); // current accumulated elements        } 701 for (i = 0; i < N; i += VL)   — 702
{
    vmm3 = cmpgt(vmm0, load b[i:i+VL]);   — 703
    mask = extract_sign_bits(vmm3);   — 704 vmm1 = load (shuffleTable[2*mask+1-numOfElem:2*mask+1-numOfElem+VL]);   — 705
    vmm3 = shuffle (vmm1, load (a[i:i+VL]));   — 706 num = popcnt(mask);   — 707
    vmm1 = load (blendTable[4-num]);   — 708
    vmm2 = blend(vmm3, vmm2, vmm1);   — 709 numOfElem += num;   — 710
    if (numOfElem >= VL)   — 711
    {
        store (dst, vmm2);   — 712
        numOfElem -= VL;   — 713
        vmm2 = vmm1;   — 714
        dst += VL;   — 715
    }
}
```

```
__declspec(align(16)) const char shuffleTable[16*2*16] =                                    ~751
{ 0x80, 0x80, 0x80, 0x80, 0x80, 0x80, 0x80, 0x80, 0x80, 0x80, 0x80, 0x80, 0x80, 0x80, 0x80, 0x80,
  0x80, 0x80, 0x80, 0x80, 0x80, 0x80, 0x80, 0x80, 0x80, 0x80, 0x80, 0x80, 0x80, 0x80, 0x80, 0x80,
  0x00, 0x01, 0x02, 0x03, 0x80, 0x80, 0x80, 0x80, 0x80, 0x80, 0x80, 0x80, 0x80, 0x80, 0x80, 0x80,
  0x00, 0x01, 0x02, 0x03, 0x80, 0x80, 0x80, 0x80, 0x80, 0x80, 0x80, 0x80, 0x80, 0x80, 0x80, 0x80,
  0x04, 0x05, 0x06, 0x07, 0x80, 0x80, 0x80, 0x80, 0x80, 0x80, 0x80, 0x80, 0x80, 0x80, 0x80, 0x80,
  0x04, 0x05, 0x06, 0x07, 0x80, 0x80, 0x80, 0x80, 0x80, 0x80, 0x80, 0x80, 0x80, 0x80, 0x80, 0x80,
  0x00, 0x01, 0x02, 0x03, 0x04, 0x05, 0x06, 0x07, 0x80, 0x80, 0x80, 0x80, 0x80, 0x80, 0x80, 0x80,
  0x00, 0x01, 0x02, 0x03, 0x04, 0x05, 0x06, 0x07, 0x80, 0x80, 0x80, 0x80, 0x80, 0x80, 0x80, 0x80,
  0x08, 0x09, 0x0a, 0x0b, 0x80, 0x80, 0x80, 0x80, 0x80, 0x80, 0x80, 0x80, 0x80, 0x80, 0x80, 0x80,
  0x08, 0x09, 0x0a, 0x0b, 0x80, 0x80, 0x80, 0x80, 0x80, 0x80, 0x80, 0x80, 0x80, 0x80, 0x80, 0x80,
  0x00, 0x01, 0x02, 0x03, 0x08, 0x09, 0x0a, 0x0b, 0x80, 0x80, 0x80, 0x80, 0x80, 0x80, 0x80, 0x80,
  0x00, 0x01, 0x02, 0x03, 0x08, 0x09, 0x0a, 0x0b, 0x80, 0x80, 0x80, 0x80, 0x80, 0x80, 0x80, 0x80,
  0x04, 0x05, 0x06, 0x07, 0x08, 0x09, 0x0a, 0x0b, 0x80, 0x80, 0x80, 0x80, 0x80, 0x80, 0x80, 0x80,
  0x04, 0x05, 0x06, 0x07, 0x08, 0x09, 0x0a, 0x0b, 0x80, 0x80, 0x80, 0x80, 0x80, 0x80, 0x80, 0x80,
  0x00, 0x01, 0x02, 0x03, 0x04, 0x05, 0x06, 0x07, 0x08, 0x09, 0x0a, 0x0b, 0x80, 0x80, 0x80, 0x80,
  0x00, 0x01, 0x02, 0x03, 0x04, 0x05, 0x06, 0x07, 0x08, 0x09, 0x0a, 0x0b, 0x80, 0x80, 0x80, 0x80,
  0x0c, 0x0d, 0x0e, 0x0f, 0x80, 0x80, 0x80, 0x80, 0x80, 0x80, 0x80, 0x80, 0x80, 0x80, 0x80, 0x80,
  0x0c, 0x0d, 0x0e, 0x0f, 0x80, 0x80, 0x80, 0x80, 0x80, 0x80, 0x80, 0x80, 0x80, 0x80, 0x80, 0x80,
  0x00, 0x01, 0x02, 0x03, 0x0c, 0x0d, 0x0e, 0x0f, 0x80, 0x80, 0x80, 0x80, 0x80, 0x80, 0x80, 0x80,
  0x00, 0x01, 0x02, 0x03, 0x0c, 0x0d, 0x0e, 0x0f, 0x80, 0x80, 0x80, 0x80, 0x80, 0x80, 0x80, 0x80,
  0x04, 0x05, 0x06, 0x07, 0x0c, 0x0d, 0x0e, 0x0f, 0x80, 0x80, 0x80, 0x80, 0x80, 0x80, 0x80, 0x80,
  0x04, 0x05, 0x06, 0x07, 0x0c, 0x0d, 0x0e, 0x0f, 0x80, 0x80, 0x80, 0x80, 0x80, 0x80, 0x80, 0x80,
  0x00, 0x01, 0x02, 0x03, 0x04, 0x05, 0x06, 0x07, 0x0c, 0x0d, 0x0e, 0x0f, 0x80, 0x80, 0x80, 0x80,
  0x00, 0x01, 0x02, 0x03, 0x04, 0x05, 0x06, 0x07, 0x0c, 0x0d, 0x0e, 0x0f, 0x80, 0x80, 0x80, 0x80,
  0x08, 0x09, 0x0a, 0x0b, 0x0c, 0x0d, 0x0e, 0x0f, 0x80, 0x80, 0x80, 0x80, 0x80, 0x80, 0x80, 0x80,
  0x08, 0x09, 0x0a, 0x0b, 0x0c, 0x0d, 0x0e, 0x0f, 0x80, 0x80, 0x80, 0x80, 0x80, 0x80, 0x80, 0x80,
  0x00, 0x01, 0x02, 0x03, 0x08, 0x09, 0x0a, 0x0b, 0x0c, 0x0d, 0x0e, 0x0f, 0x80, 0x80, 0x80, 0x80,
  0x00, 0x01, 0x02, 0x03, 0x08, 0x09, 0x0a, 0x0b, 0x0c, 0x0d, 0x0e, 0x0f, 0x80, 0x80, 0x80, 0x80,
  0x04, 0x05, 0x06, 0x07, 0x08, 0x09, 0x0a, 0x0b, 0x0c, 0x0d, 0x0e, 0x0f, 0x80, 0x80, 0x80, 0x80,
  0x04, 0x05, 0x06, 0x07, 0x08, 0x09, 0x0a, 0x0b, 0x0c, 0x0d, 0x0e, 0x0f, 0x80, 0x80, 0x80, 0x80,
  0x00, 0x01, 0x02, 0x03, 0x04, 0x05, 0x06, 0x07, 0x08, 0x09, 0x0a, 0x0b, 0x0c, 0x0d, 0x0e, 0x0f };

__declspec(align(16)) const int blendTable[8] = {0, 0, 0, 1, 0, 0, 0, 0};           ~752
```

FIG. 8

METHODS TO OPTIMIZE A PROGRAM LOOP VIA VECTOR INSTRUCTIONS USING A SHUFFLE TABLE AND A MASK STORE TABLE

CROSS-REFERENCE TO RELATED APPLICATION

This patent application is a U.S. National Phase Application under 35 U.S.C. §371 of International Application No. PCT/US2011/065213, filed Dec. 15, 2011, entitled METHODS TO OPTIMIZE A PROGRAM LOOP VIA VECTOR INSTRUCTIONS USING A SHUFFLE TABLE AND A MASK TABLE.

FIELD OF THE INVENTION

Embodiments of the present invention relate generally to optimization of a program loop. More particularly, embodiments of the invention relate to optimization of a program loop via vector instructions using a shuffle table and a mask store table.

BACKGROUND

Nearly all data processing applications involve operations that must be iteratively performed on sets of data. Such program loops may include any number of instructions and may be iterated any number of times as established by the computer program. It is very common to assign values of a first array to a second array based on conditions of a third array. Typically, in order to implement such operations, a program loop is utilized to iteratively assign elements of the first array to elements of the second array dependent upon the corresponding elements of the third array, one element at a time in a scalar manner as shown in FIG. 3.

In the example as shown in FIG. 3, elements of array a[ ] are assigned to array dest[ ] based on the values or conditions of the corresponding elements of array b[ ], one element at a time in the program loop. However, such an implementation is inefficient due to a large amount of iterations and instructions to be executed by a processor.

BRIEF DESCRIPTION OF THE DRAWINGS

Embodiments of the invention are illustrated by way of example and not limitation in the figures of the accompanying drawings in which like references indicate similar elements.

FIG. 3 is pseudo code representing a typical program loop.

FIG. 4 is pseudo code representing a program loop with advanced vector instructions according to one embodiment.

FIG. 5 is a diagram illustrating a data structure storing a shuffle table and a mask store table according to one embodiment.

FIG. 7 is pseudo code representing a program loop with advanced vector instructions according to another embodiment.

FIG. 8 is a diagram illustrating a data structure storing a shuffle table and a blend table according to one embodiment.

DETAILED DESCRIPTION

Figure 1:
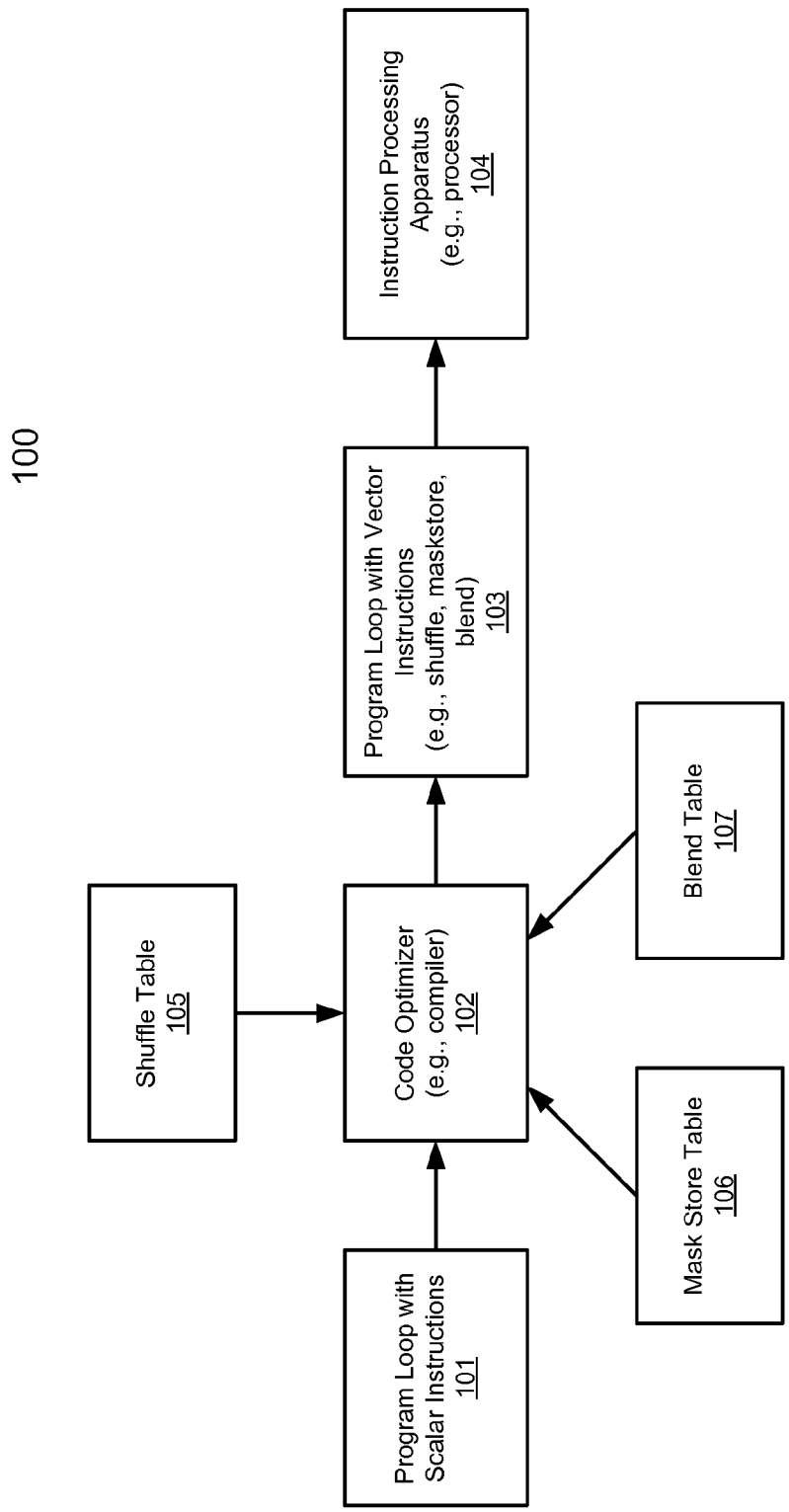
FIG. 1 is a block diagram illustrating a code optimizer according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a code optimizer (e.g., compiler) is utilized to optimize scalar instructions of a program loop using vector instructions to perform iterations of the program loop in a vector manner. The iterations of the program loop are performed by executing the vector or packed instructions by a vector capable processor such as a single-instruction-multiple-data (SIMD) processor. By using vector or packed instructions, a number of iterations of the program loop can be reduced or shortened based on a vector length of the vector instructions or a number of instructions packed within a SIMD instruction. Certain iterations of a typical program loop can be performed in parallel by a vector capable processor using vector instructions. As a result, the efficiency of execution of the program loop can be greatly improved.

According to one embodiment, first code having a program loop for assigning elements of a first array (e.g., source array) to elements of a second array (e.g., destination array) based on values or conditions of elements of a third array (e.g., condition array) is received by a code optimizer. In response, the code optimizer is configured to generate second code having vector instructions to perform the same operations of the program loop. In one embodiment, the second code includes, in each iteration of the program loop, a VECTOR_SHUFLE instruction to shuffle elements of the first array using a shuffle table based on values or conditions of the corresponding elements of the third array and a VECTOR_MASKSTORE instruction to store the shuffled elements of the first array in the second array in a vector manner.

In another embodiment, the second code includes, in each iteration of the program loop, a VECTOR_SHUFLE instruction to shuffle elements of the first array using a shuffle table based on values or conditions of the corresponding elements of the third array and a VECTOR_BLEND instruction to blend the shuffled elements of the first array in a vector manner. Dependent upon the vector length, once the elements of the first array have been accumulated via the blending operations, the blended elements of the first array are then stored in the second array.

FIG. 1 is a block diagram illustrating a code optimizer according to one embodiment. Referring to FIG. 1, system 100 includes a code optimizer 102 to receive first code 101 having a program loop with scalar instructions such as those as shown in FIG. 3. The program loop in first code 101 includes scalar instructions to iteratively assign values of elements of a first array to elements of a second array based on values or conditions of elements of a third array, respectively. In response to first code 101, code optimizer 102 is configured to convert the scalar instructions of first code 101 into second code 103 having at least one vector instruction to replace some scalar instructions of first code 101. In one embodiment, code optimizer is configured to pack multiple data of multiple scalar iterations into a single SIMD instruction. The at least one vector instruction of second code 103 enable a vector capable processor 104 (e.g., a SIMD capable processor) to execute the at least one vector instruction to perform certain steps in the program loop in parallel, for example, during a single instruction cycle.

In one embodiment, during each iteration, second code 103 includes a shuffle instruction, referred to herein as a VECTOR_SHUFFLE instruction, to shuffle elements of the first array using shuffle table 105 based on a mask generated according to values or conditions of corresponding elements of the third array. Second code 103 further includes a store instruction, referred to herein as a VECTOR_MASKSTORE instruction, to store the shuffled elements of the first array in the second array based on the mask. In another embodiment, during each iteration, second code 103 includes a VECTOR_SHUFFLE instruction to shuffle elements of the first array using shuffle table 105 based on a mask generated according to values or conditions of corresponding elements of the third array. Second code 103 further includes a blend instruction, referred to herein as a VECTOR_BLEND instruction, to blend the shuffled elements of the first array with the previously shuffled elements. When all elements of the first array have been shuffled and blended, the blended elements of the first array are then stored in the second array. Note that code optimizer 102 can be implemented in hardware, software, or a combination thereof.

In one embodiment, code optimizer 102 may be part of a compiler and processor 104 may be an advanced vector extension (AVX) compatible processor available from Intel® Corporation of Santa Clara, Calif. In one embodiment, a VECTOR_SHUFFLE instruction may be one of PSHUFB, PSHUFD, PSHUFHW, and PSHUFLW of the streaming SIMD extensions (SSE) and/or AVX compatible instructions. A VECTOR_MASKSTORE instruction may be one of MASKMOVDQU, VMASKMOV, and MASKMOVQ of the SSE/AVX compatible instructions. A VECTOR_BLEND instruction may be one of BLENDPD, BLENDPS, BLENDVPD, and BLENDVPS of the SSE/AVX compatible instructions.

Figure 2:
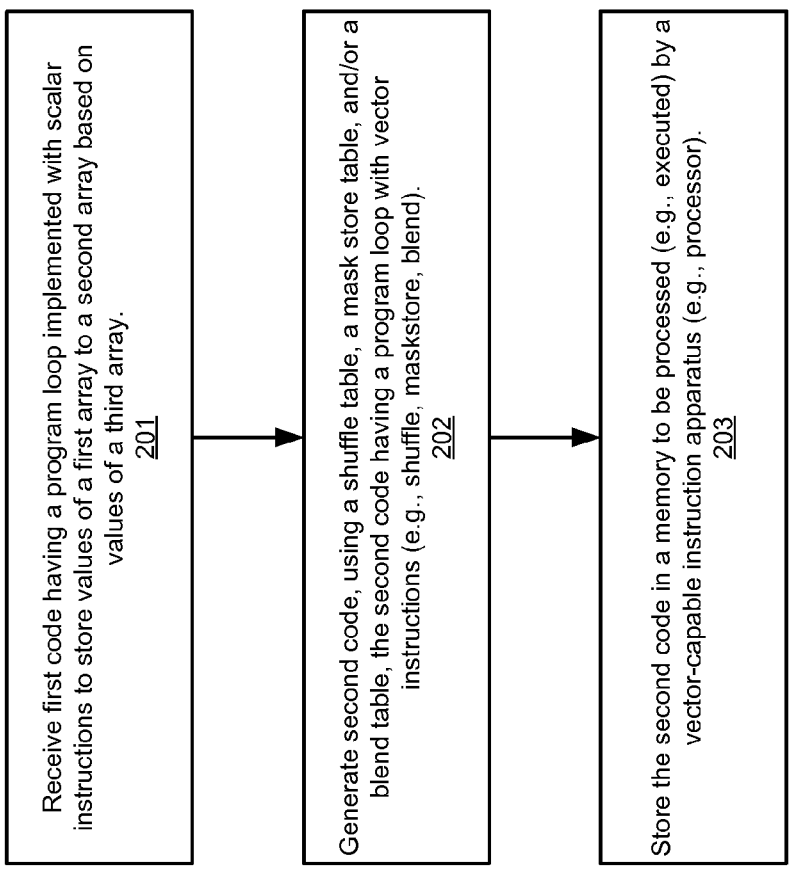
FIG. 2 is a flow diagram illustrating a method to optimize program code according to one embodiment.

FIG. 2 is a flow diagram illustrating a method to optimize program code according to one embodiment. For example, method 200 may be performed by code optimizer 102 of FIG. 1. Referring to FIG. 2, at block 201, processing logic receives first code having a program loop having scalar instructions to store values of a first array to a second array based on values or conditions of a third array. At block 202, processing logic generates second code having at least one vector instruction, such as a VECTOR_SHUFFLE, VECTOR_MASKSTORE, and VECTOR_BLEND instructions, to perform some iterations of the program loop in a vector manner. The vector instructions may be compatible with AVX-based vector instructions. At block 203, the second code is stored in a memory to be executed by a vector-capable processor.

FIG. 3 is pseudo code representing a typical program loop having scalar instructions. Referring to FIG. 3, in this example, pseudo code 300 includes a program loop (e.g., for-loop) to assign values of elements of first array 301 to corresponding elements of second array 302 based on values or conditions of corresponding elements of third array 303, respectively. In this example, each of the elements of arrays 301-303 are iteratively processed, one element at a time in each iteration. As shown in FIG. 3, during each iteration, an element of array 303 is evaluated at line 304 and if the condition is satisfied, the element of array 301 is then assigned to the corresponding element of array 302 at line 305. Thereafter, the index is incremented at line 306 for the next element, which will be performed in next iteration. In such a configuration, the processor has to perform a number of iterations that equals to the number of elements in array 301. If array 301 has a large number of elements, there will be a large number of iterations, which may be significantly inefficient and resource consuming.

FIG. 4 is pseudo code representing a program loop using vector-based or packed instructions according to one embodiment of the invention. In this example, pseudo code 400 may be generated by code optimizer 102 of FIG. 1 based on pseudo code 300 of FIG. 3. Referring to FIG. 4, multiple data are packed into a vector register and a vector or packed instruction (e.g., a SIMD instruction) is utilized as a packed instruction to perform multiple operations in parallel within the same iteration, where those multiple operations would have to be performed one at a time within an iteration of a conventional scalar program loop.

At line 401, the condition value (e.g., topVal) is loaded with broadcast into a vector register VMM0. Dependent upon the size of VMM0 register multiple copies of the condition value may be loaded in VMM0 using a load with broadcast instruction. VMM0 can be a 128-bit, 256-bit, 512-bit, or other size register. A load-with-broadcast instruction may be one of VBROADCASTSS, VBROADCASTSD, and VBROADCASTF of the SSE/AVX compatible instructions. A load-with-broadcast instruction, when executed, is to load values from a source operand (e.g., topVal) and broadcast to all elements of the destination operand (e.g., VMM0).

In this example, it is assumed:
topVal=0;
array a[4]={0,1,2,3};
array b[4]={-2,-2,1,-2}.

The instruction at line 401 would load all zero into VMM0 register. Program loop 402 is then performed on an increment of a vector length (VL) since each iteration performs a number of assignment operations that equals to the VL. Dependent upon the size of the registers, VL can be 4, 8, or 16 for 128-bit, 256-bit, or 512-bit registers, respectively. At line 403, the instruction loads 4 values from array b[ ] and compares with vector of topVal stored in VMM0 (in this example all 0). The result stored in VMM2 register will be {-1, -1, 0, -1}, because these are the values in array b[ ] which are less than topVal in VMM0. Again throughout this application, any register, such as VMM0, VMM1, and VMM2, described herein, may be a 128-bit, 256-bit, 512-bit, or other size register. In this example, a packed compare-greater-than instruction is utilized which can compare multiple values in a vector manner within a single instruction cycle. In one embodiment, a packed compare-greater-than instruction may be one of a PCMPGTB, PCMPGTW, PCMPGTD or PCMPGTQ of the SSE/AVX compatible instructions dependent upon the data and/or register width.

At line 404, the sign bits of each element in VMM2 are extracted and stored in a register or memory "mask," which is 0xD in this example. In one embodiment, a packed extract-sign-bit instruction is utilized, which can be one of MOVMSKPD and MOVMSKPS of the SSE/AVX compatible instructions, which extracts the sign bits from the packed floating-point values in the source operand, formats them into a mask, and stores the mask in the destination operand.

At line 405, the shuffle control is loaded from a shuffle table according to mask value stored in "mask." An example of a shuffle table is shown as shuffle table 501 in FIG. 5, which may be implemented as part of shuffle table 105 of FIG. 1. In this example, the shuffle control represented by a mask is {0x00, 0x01, 0x02, 0x03, 0x08, 0x09, 0x0a, 0x0b, 0x0c, 0x0d, 0x0e, 0x0f, 0x80, 0x80, 0x80, 0x80}, which is loaded into register "mask" based on the sign bits extracted from the comparison result stored in VMM1 register (e.g., −1, −1, 0, −1).

At line 406, four elements are loaded from array A {0, 1, 2, 3} and shuffled according to the shuffle control previously loaded in VMM1. The result will be {0, 2, 3, 0} and stored in VMM2 register. In one embodiment, a packed shuffle instruction is utilized, which can be one of PSHUFB, PSHUFD, PSHUFHW, and PSHUFLW of the SSE/AVX compatible instructions. A packed shuffle instruction is to perform in-place shuffles of various sizes in the destination operand according to the shuffle control mask in the source operand. The instruction permutes the data in the destination operand, leaving the shuffle mask unaffected. If the most significant bit of each of the shuffle control mask is set, then constant zero is written in the result. Each element in the shuffle control mask forms an index to permute the corresponding byte in the destination operand. The value of each index is the least significant 4 bits (128-bit operation) or 3 bits (64-bit operation) of the shuffle control byte.

At line 407, the number of bits that has a predetermined logical value (e.g., logical value of one) stored in "mask" is counted and stored in "num." In one embodiment, a POPCNT compatible with the AVX instructions is utilized, where the POPCNT instruction returns a number of bits that have a logical value of one. At line 408, the mask control is loaded into VMM1 according to the number of bits from a mask store table. An example of a mask store table is shown as table 502 in FIG. 5, which may be implemented as part of mask store table 106 of FIG. 1. In this example, VMM1 would contain {−1, −1, −1, 0} from the mask store table 502.

At line 409, a mask store operation is performed, which store values of VMM2 selected based on a mask stored in VMM1 into the destination array. In this example only the first 3 elements of VMM2 will be stored (e.g., based on the mask of {−1, −1, −1, 0}). In one embodiment, packed mask store instruction is utilized herein, which can be one of MASKMOVDQU, VMASKMOV, and MASKMOVQ of the AVX compatible instructions. At line 410, an index or pointer of the destination array is incremented by a number of the elements stored during the mask store operation. As a result, each iteration of program loop 402 can perform multiple operations in a vector manner dependent upon the associated vector length. Note that the pseudo code and data structures as shown in FIGS. 3-5 are described for the purpose of illustration only; other code or programming languages, as well as certain packed or vector instructions may also be utilized.

Figure 6:
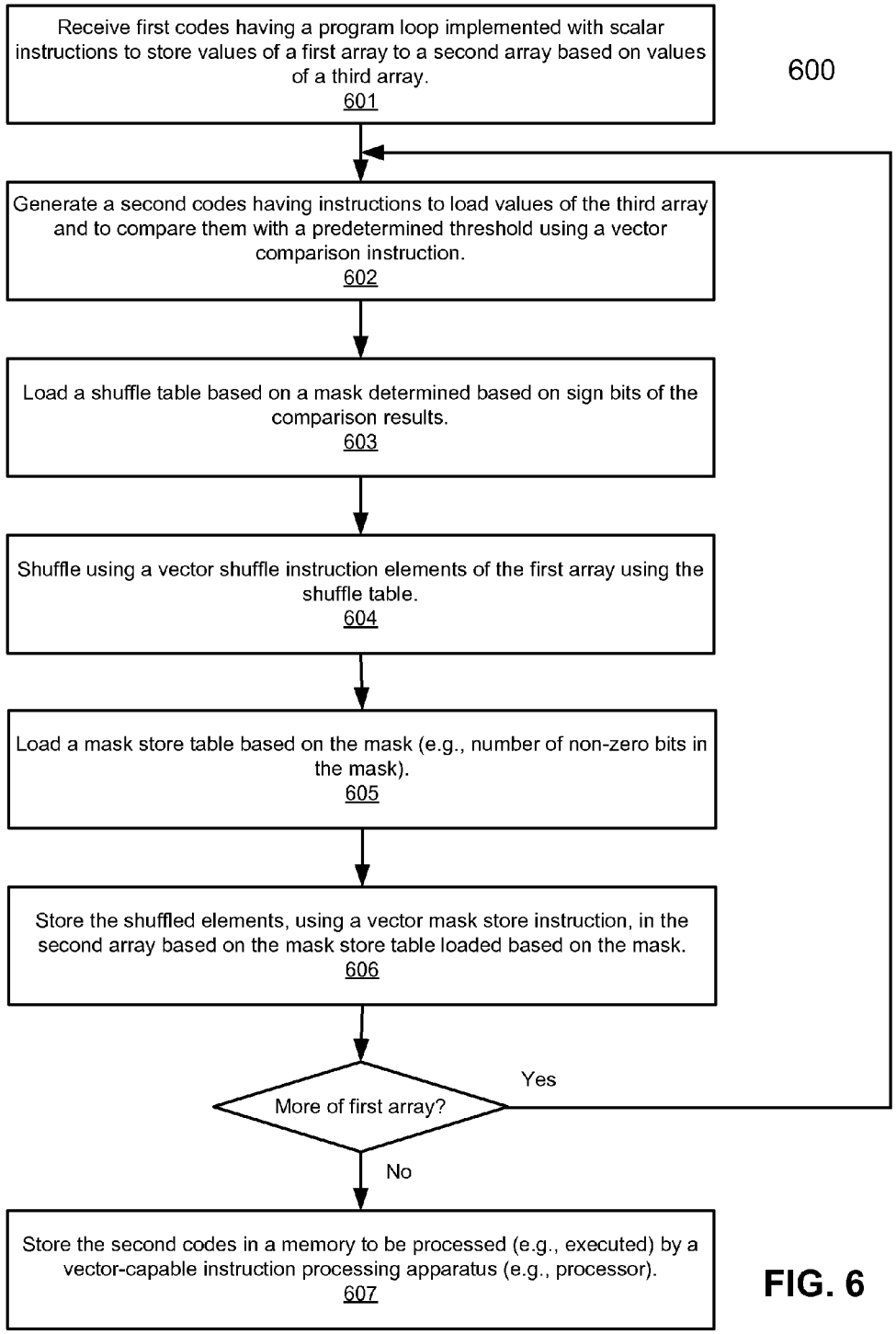
FIG. 6 is a flow diagram illustrating a method for optimizing a program loop according to one embodiment.

FIG. 6 is a flow diagram illustrating a method for optimizing a program loop according to one embodiment. For example, method 600 may be performed by code optimizer 102 of FIG. 1. Referring to FIG. 6, at block 601, a first code having a program loop implemented with scalar instructions is received. The first code is to store values of a first array to a second array based on values of a third array. At block 602, the code optimizer is to generate second code based on the first code to load values of the third array and to compare them with a predetermined threshold using a vector comparison instruction. At block 603, the second code is to load a shuffle table based on a mask determined based on sign bits of the comparison result. At block 604, the second code is to shuffle using a vector shuffle instruction elements of the first array using the shuffle table. At block 605, a mask store table is loaded based on the mask (e.g., number of non-zero bits in the mask). At block 606, the shuffled elements are then stored, using a vector mask store instruction, in the second array based on the mask store table. The above operations are performed in each of the iterations, where each iteration performs multiple operations (e.g., up to the vector length) in parallel using vector instructions. The second code is then stored in the memory at block 607.

In another embodiment, instead of using a VECTOR_MASKSTORE instruction, the second code includes, in each iteration of the program loop, a VECTOR_SHUFFLE instruction to shuffle elements of the first array using a shuffle table based on values or conditions of the corresponding elements of the third array and a VECTOR_BLEND instruction to blend the shuffled elements of the first array in a vector manner. Dependent upon the vector length, once the elements of the first array have been accumulated via the blending operations, the blended elements of the first array are then stored in the second array.

FIG. 7 is pseudo code representing a program loop using vector-based or packed instructions according to another embodiment of the invention. In this example, pseudo code 700 may be generated by code optimizer 102 of FIG. 1 based on pseudo code 300 of FIG. 3. Referring to FIG. 7, multiple data are packed into a vector register and a vector or packed instruction (e.g., a SIMD instruction) is utilized as a packed instruction to perform multiple operations in parallel within the same iteration, where those multiple operations would have to be performed one at a time within an iteration of a conventional scalar program loop. In this embodiment, the process will accumulate results until it has processed a number elements equaled to the vector length. Instead of using the mask store instruction as described above, a blend instruction with a blend table is utilized.

Referring to FIG. 7, at lines 701, certain initializations of the program loop are performed. In this example, the condition value (e.g., topVal) is loaded with broadcast into a vector register VMM0. Dependent upon the size of VMM0 register multiple copies of the condition value may be loaded in VMM0 using a load with broadcast instruction. VMM0 can be a 128-bit, 256-bit, 512-bit, or other size register. A load-with-broadcast instruction may be one of VBROADCASTSS, VBROADCASTSD, and VBROADCASTF of the AVX compatible instructions. A load-with-broadcast instruction, when executed, is to load values from a source operand (e.g., topVal) and broadcast to all elements of the destination operand (e.g., VMM0).

In addition, an accumulation counter numOfElem represents a number of elements have been processed, but that have not been stored in the destination array. In this example, it is assumed:
topVal=0;
a[8]={0, 1, 2, 3, 4, 5, 6, 7};
b[8]={−2, −2, 1, −2, −2, 1, 1, −2}.

The instruction at line 701 would load all zero into VMM0 register. Program loop 702 is then performed on an increment of a vector length (VL) since each iteration performs a number of assignment operations that equals to the VL. Dependent upon the size of the registers, VL can be 4, 8, or 16 for 128-bit, 256-bit, or 512-bit registers, respectively.

At line 703, the instruction loads 4 values from array b[ ] and compares with vector of topVal stored in VMM0 (in this example all 0). The result stored in VMM3 register will be {−1, −1, 0, −1}, because these are the values in array b[ ] which are less than topVal in VMM0. Again throughout this application, any register, such as VMM0, VMM1, VMM2, and VMM3, described herein, may be a 128-bit, 256-bit, 512-bit, or other size register. In this example, a packed compare-greater-than instruction is utilized which can compare multiple values in a vector manner within a single instruction cycle. In one embodiment, a packed compare-greater-than instruction may be one of a PCMPGTB, PCMPGTW, PCMPGTD or PCMPGTQ of the AVX compatible instructions dependent upon the data and/or register width.

At line 704, the sign bits of each element in VMM3 are extracted and stored in a register or memory "mask," which is 0xD in this example. In one embodiment, a packed extract-sign-bit instruction is utilized, which can be one of MOVMSKPD and MOVMSKPS of the AVX compatible instructions, which extracts the sign bits from the packed floating-point values in the source operand, formats them into a mask, and stores the mask in the destination operand.

At line 705, the shuffle control is loaded into VMM1 register from a shuffle table according to mask value stored in "mask" and a number of elements currently accumulated "numOfElem." An example of a shuffle table is shown as shuffle table 751 in FIG. 8, which may be implemented as part of shuffle table 105 of FIG. 1. In this example, the shuffle control in VMM1 is {0x00, 0x01, 0x02, 0x03, 0x08, 0x09, 0x0a, 0x0b, 0x0c, 0x0d, 0x0e, 0x0f, 0x80, 0x80, 0x80, 0x80}.

At line 706, four elements are loaded from array A {0, 1, 2, 3} and shuffled according to the shuffle control previously loaded in VMM1. The result will be {0, 1, 3, 0} and stored in VMM3 register. In one embodiment, a packed shuffle instruction is utilized, which can be one of PSHUFB, PSHUFD, PSHUFHW, and PSHUFLW of the AVX compatible instructions. A packed shuffle instruction is to perform in-place shuffles of various sizes in the destination operand according to the shuffle control mask in the source operand. The instruction permutes the data in the destination operand, leaving the shuffle mask unaffected. If the most significant bit of each of the shuffle control mask is set, then constant zero is written in the result. Each element in the shuffle control mask forms an index to permute the corresponding byte in the destination operand. The value of each index is the least significant 4 bits (128-bit operation) or 3 bits (64-bit operation) of the shuffle control byte.

At line 707, the number of bits that has a predetermined logical value (e.g., logical value of one) stored in "mask" is counted and stored in a register or memory "num." In this example, "num" is 3. In one embodiment, a POPCNT compatible with the AVX instructions is utilized, where the POPCNT instruction returns a number of bits that have a logical value of one. At line 708, the blend control is loaded into VMM1 from a blend table according to the number of elements that are accumulated "num." An example of a blend table is shown as table 752 in FIG. 8, which may be implemented as part of blend table 107 of FIG. 1. In this example, VMM1 would contain {0, 0, 0, 0} from the blend table 752.

At line 709, the accumulated elements stored in VMM2 are blended with the shuffled elements stored in VMM3 using the blend control previously loaded in VMM1. The results will be {0, 1, 3, 0} and stored in VMM2. In one embodiment, the blending operations of multiple elements are performed using a VECTOR_BLEND instruction in a vector manner, which can be one of BLENDPD, BLENDPS, BLENDVPD, and BLENDVPS of the AVX compatible instructions. A VECTOR_BLEND is to conditionally copy each data element of value from the second source operand (e.g., VMM2) and the first source operand (e.g., VMM1) depending on mask bits defined in the mask register operand (e.g., VMM3). The mask bits are the most significant bit in each element of the mask register.

Thereafter, at line 710, the accumulated number of elements numOfElem is updated by an increment of the value stored in "num," which corresponds to the number of elements blended. At line 711, if the accumulated number of elements processed in numOfElem is greater than the vector length VL, the blended elements stored in VMM2 are stored in the destination array, and the iteration repeats for next VL of elements. In this example, "num" equals to 3 which is less than VL of 4. As a result, the accumulated blended elements would not be stored in the destination array. Instead, a next iteration is performed.

Back to line 703, 4 values are loaded from b[ ] and compared with vector of topVal (in this example all zero). The result will be {−1, 0, 0, −1}. At line 704, the sign bits of each element are extracted and stored in a 64 bit register mask (in this example, the value will be 0x9). At line 705, the shuffle control is loaded from the shuffle table according to mask value and the current number of elements accumulated (e.g., 3). In this example the shuffle control will be {0x0c, 0x0d, 0x0e, 0x0f, 0x80, 0x80, 0x80, 0x80, 0x80, 0x80, 0x80, 0x80, 0x00, 0x01, 0x02, 0x03}. At line 706, 4 elements are loaded from array a[ ] (e.g., {4, 5, 6, 7}) and shuffled according to the control loaded previously.

The result will be {7, 0, 0, 4}. At line 707, number of bits that has the value 1 in mask are counted (in this example the result is 2). At line 708, the blend control is loaded according to the number of elements already accumulated. In this example the blend control will be {0, 0, 0, 1}.

At line 709, the accumulated elements are blended with the shuffled elements using the blend control previously loaded. The result will be {0, 1, 3, 4}. At line 710, the number of elements accumulated this iteration are added (in this example the new value will be 3+2=5). At line 711, the accumulated number is compared with the vector length VL of 4. In this situation, the condition is met. At line 712, the accumulated register is stored. At line 713, the number of accumulated elements is decremented by 4 (e.g., VL), which results in 1. At line 714, the shuffled elements are designated as the new accumulated vector register. The rotation of the loaded values placed the latest accumulated elements in the beginning of the vector which matches the remaining number of accumulated elements. The result will be {7, DC, DC, DC} (DC=Don't Care). At line 715, the destination pointer is incremented by 4 (e.g., VL) elements.

Figure 9:
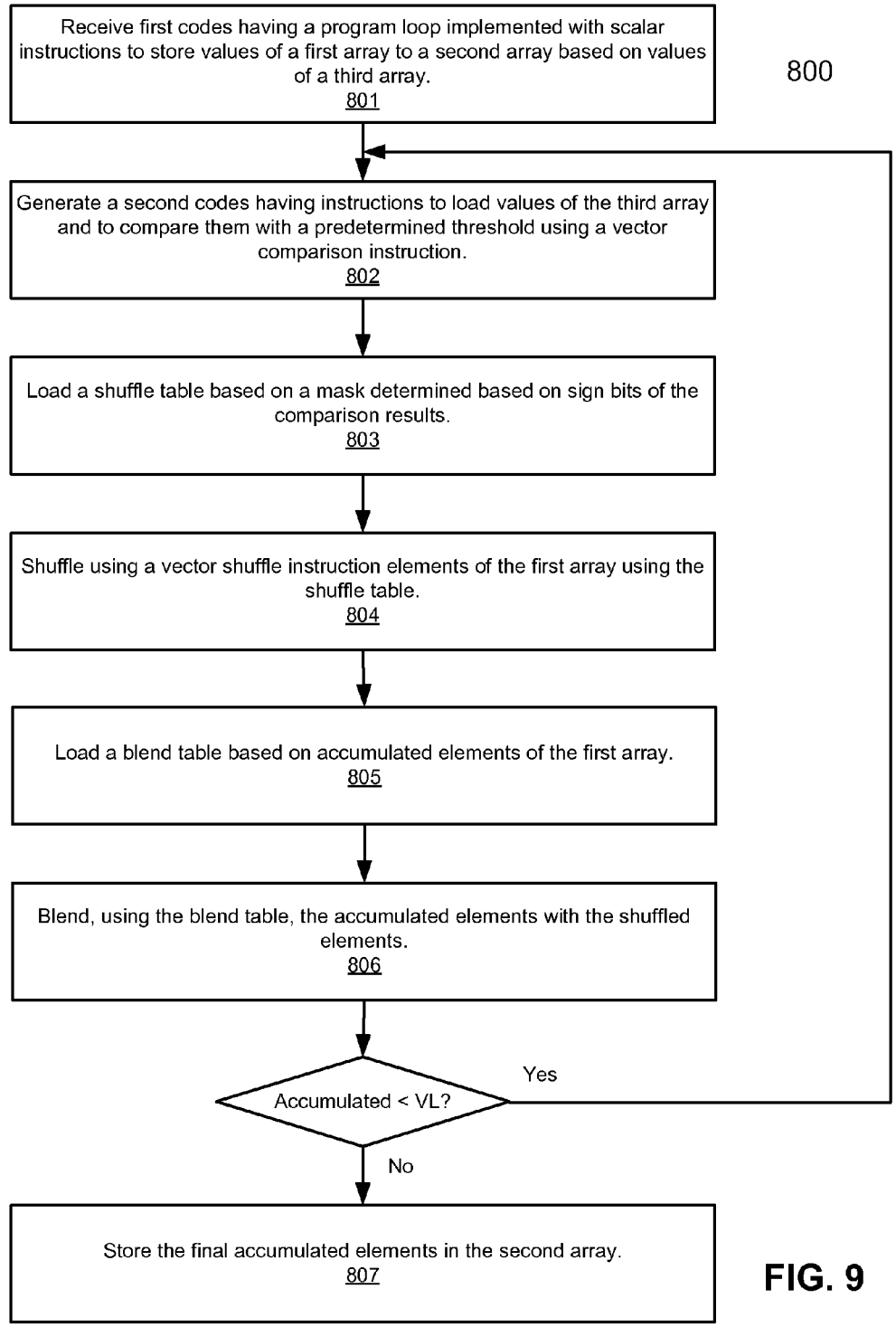
FIG. 9 is a flow diagram illustrating a method for optimizing a program loop according to another embodiment.

FIG. 9 is a flow diagram illustrating a method for optimizing a program loop according to another embodiment. Method 800 may be performed by code optimizer 102 of FIG. 1. Referring to FIG. 8, at block 801, a first code having a program loop implemented with scalar instructions is received. The first code is to store values of a first array to a second array based on values of a third array. At block 802, the code optimizer is to generate second code based on the first code to load values of the third array and to compare them with a predetermined threshold using a vector comparison instruction. At block 803, the second code is to load a shuffle table based on a mask determined based on sign bits of the comparison result. At block 804, the second code is to shuffle using a vector shuffle instruction elements of the first array using the shuffle table. At block 805, a blend table is loaded based on accumulated elements of the first array. At block 806, the shuffled elements are blended with the accumulated elements of the first array using a vector blend instruction. If a number of accumulated elements is less than the vector length, the operations of blocks 802-806 are performed iteratively. Otherwise, at block 807, the accumulated elements of the first array are then stored in the second array. The above operations are then iteratively performed for all elements of the first array.

Figure 10:
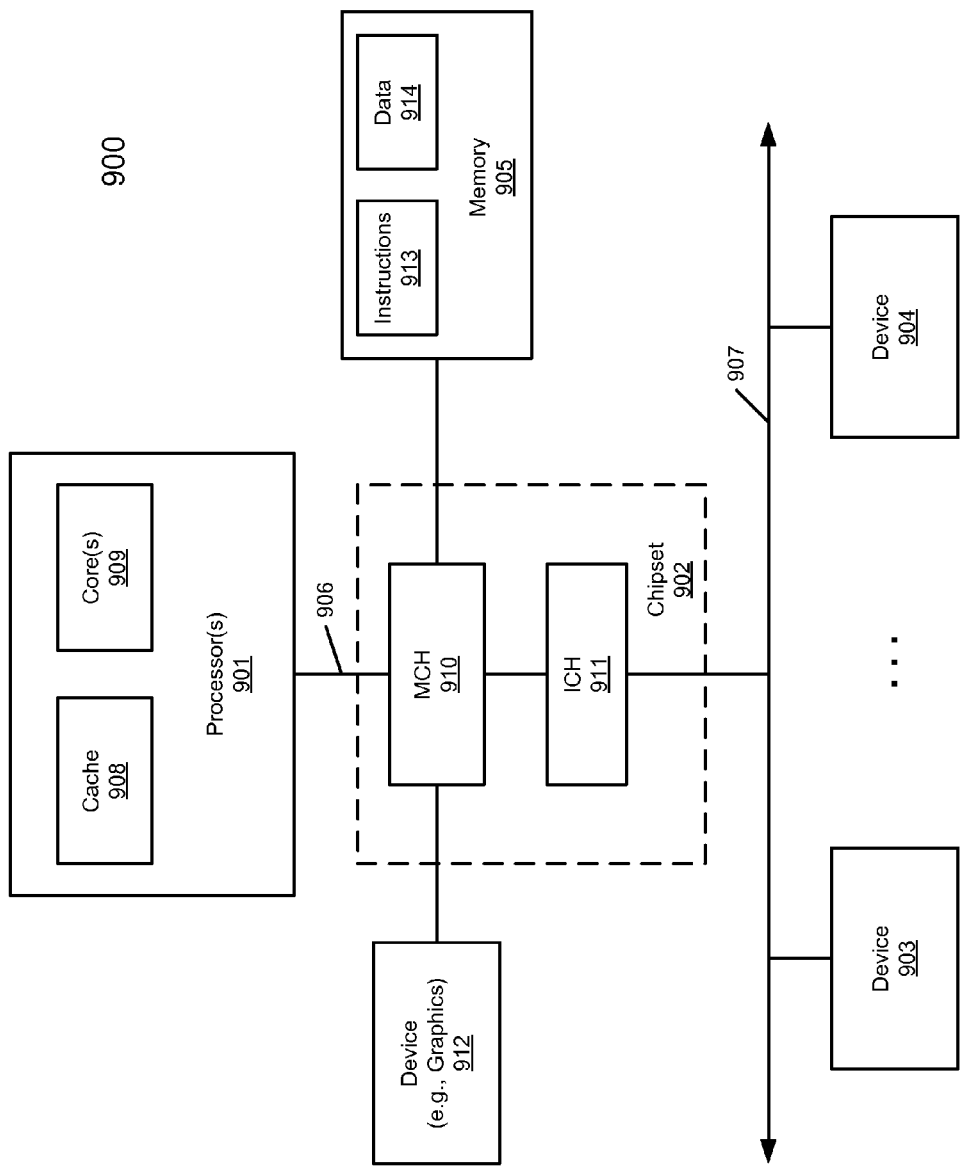
FIG. 10 is a block diagram illustrating an example of a data processing system according to one embodiment.

FIG. 10 is a block diagram illustrating an example of a data processing system according to one embodiment of the invention. For example, system 900 may represent any of systems 100 of FIG. 1. Processor(s) 901 may represent processor 104 of FIG. 1. System 900 may represent any of the systems described above. For example, system 900 may represent a desktop, a laptop, a tablet, a server, a mobile phone (e.g., Smartphone), a media player, a personal digital assistant (PDA), a personal communicator, a gaming device, a network router or hub, a wireless access point or repeater, a set-top box, or a combination thereof. Note that while FIG. 10 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the present invention.

Referring to FIG. 10, in one embodiment, system 900 includes processor 901 and chipset 902 to couple various components to processor 901 including memory 905 and devices 903-904 via a bus or an interconnect. Processor 901 may represent a single processor or multiple processors with a single processor core or multiple processor cores 909 included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. For example, processor 901 may be a Pentium® 4, Pentium® Dual-Core, Core™ 2 Duo and Quad, Xeon™, Itanium™, XScale™, Core™ i7, Core™ i5, Celeron®, or StrongARM™ microprocessor available from Intel Corporation of Santa Clara, Calif. Processor 901 is configured to execute instructions for performing the operations and steps discussed herein.

Processor 901 may include an instruction decoder, which may receive and decode a variety of instructions. The decoder may generate and output one or more micro-operations, micro-code entry points, microinstructions, other instructions, or other control signals, which reflect, or are derived from, an original input instruction. The decoder may be implemented using various different mechanisms. Examples of suitable mechanisms include, but are not limited to, microcode read only memories (ROMs), look-up tables, hardware implementations, programmable logic arrays (PLAs), and the like.

The decoder may not be a required component of processor 901. In one or more other embodiments, processor 901 may instead have an instruction emulator, an instruction translator, an instruction morpher, an instruction interpreter, or other instruction conversion logic. Various different types of instruction emulators, instruction morphers, instruction translators, and the like, are known in the arts. The instruction conversion logic may receive the bit range isolation instruction, emulate, translate, morph, interpret, or otherwise convert the bit range isolation instruction, and output one or more instructions or control signals corresponding to the original bit range isolation instruction. The instruction conversion logic may be implemented in software, hardware, firmware, or a combination thereof. In some cases, some or all of the instruction conversion logic may be located off-die with the rest of the instruction processing apparatus, such as a separate die or in a system memory. In some cases, the instruction processing apparatus may have both the decoder and the instruction conversion logic.

Processor 901 and/or cores 909 may further include one or more execution units coupled with, or otherwise in communication with, an output of the decoder. The term "coupled" may mean that two or more elements are in direct electrical contact or connection. However, "coupled" may also mean that two or more elements are not in direct connection with each other, but yet still co-operate or interact or communicate with each other (e.g., through an intervening component). As one example, the decoder and the execution unit may be coupled with one another through an intervening optional buffer or other component(s) known in the arts to possibly be coupled between a decoder and an execution unit. Processor 901 and/or cores 909 may further include multiple different types of execution units, such as, for example, arithmetic units, arithmetic logic units (ALUs), integer units, etc.

Processor 901 may further include one or more register files including, but are not limited to, integer registers, floating point registers, vector or extended registers, status registers, and an instruction pointer register, etc. The term "registers" is used herein to refer to the on-board processor storage locations that are used as part of macro-instructions to identify operands. In other words, the registers referred to herein are those that are visible from the outside of the processor (from a programmer's perspective). However, the registers should not be limited in meaning to a particular type of circuit. Rather, a register need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit or 64-bit integer data. A register file may contain extended multimedia SIMD registers (e.g., XMM) for packed data. Such registers may include 128 bits wide XMM registers and 256 bits wide registers (which may incorporate the XMM registers in their low order bits) relating to SSE2, SSE3, SSE4, GSSE, and beyond (referred to generically as "SSEx") technology to hold such packed data operands.

Processor 901 and/or cores 909 may also optionally include one or more other well-known components. For example, processor 901 may optionally include instruction fetch logic, pre-decode logic, scheduling logic, re-order buffers, branch prediction logic, retirement logic, register renaming logic, and the like, or some combination thereof. These components may be implemented conventionally, or with minor adaptations that would be apparent to those skilled in the art based on the present disclosure. Further description of these components is not needed in order to understand the embodiments herein, although further description is readily available, if desired, in the public literature. There are literally numerous different combinations and configurations of such components known in the arts. The scope is not limited to any known such combination or configuration. Embodiments may be implemented either with or without such additional components.

Chipset 902 may include memory control hub (MCH) 910 and input output control hub (ICH) 911. MCH 910 may include a memory controller (not shown) that communicates with a memory 905. MCH 910 may also include a graphics interface that communicates with graphics device 912. In one embodiment of the invention, the graphics interface may communicate with graphics device 912 via an accelerated graphics port (AGP), a peripheral component interconnect (PCI) express bus, or other types of interconnects. ICH 911 may provide an interface to I/O devices such as devices 903-904. Any of devices 903-904 may be a storage device (e.g., a hard drive, flash memory device), universal serial bus (USB) port(s), a keyboard, a mouse, parallel port(s), serial port(s), a printer, a network interface (wired or wireless), a wireless transceiver (e.g., WiFi, Bluetooth, or cellular transceiver), a media device (e.g., audio/video codec or controller), a bus bridge (e.g., a PCI-PCI bridge), or a combination thereof.

Figure 11:
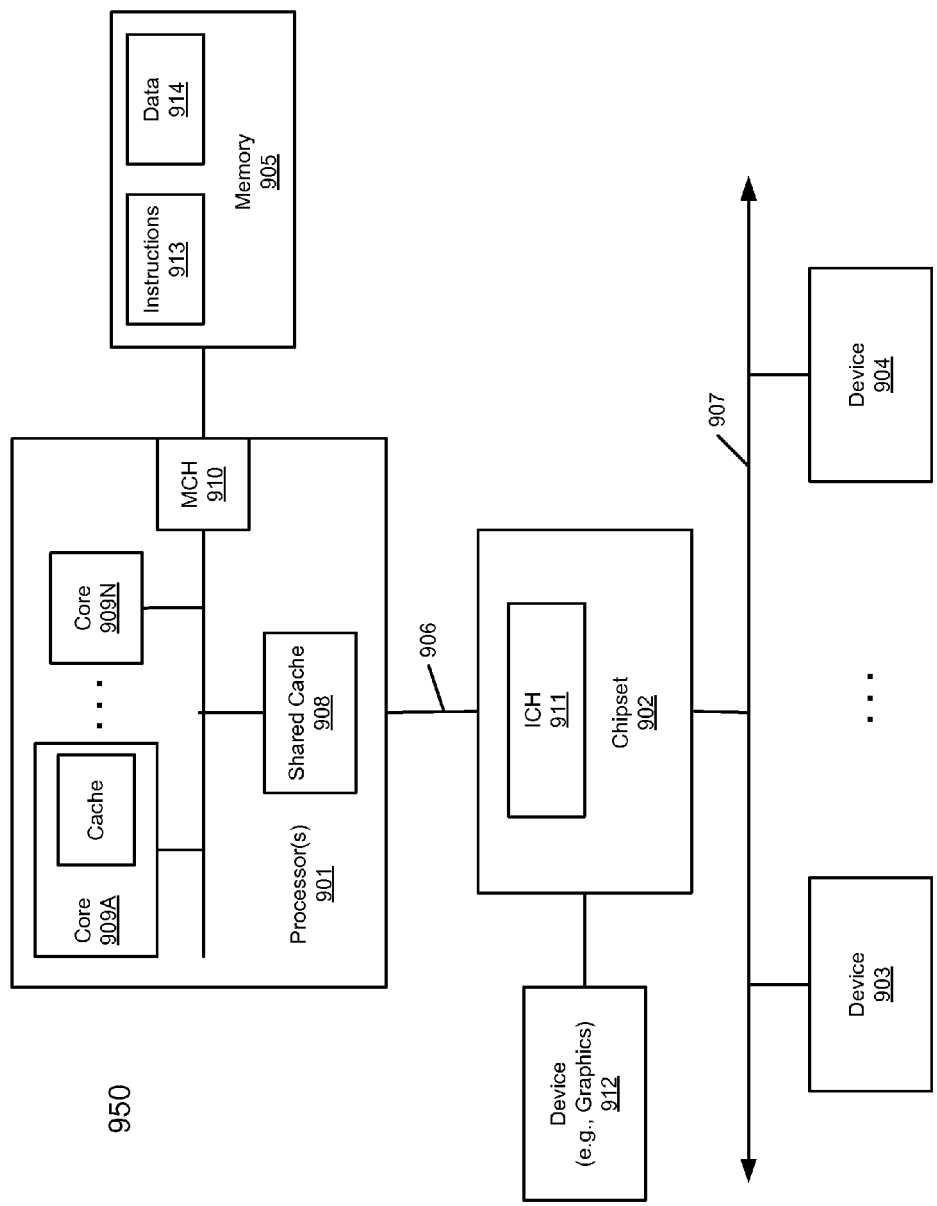
FIG. 11 is a block diagram illustrating an example of a data processing system according to another embodiment.

MCH 910 is sometimes referred to as a Northbridge and ICH 911 is sometimes referred to as a Southbridge, although some people make a technical distinction between them. As used herein, the terms MCH, ICH, Northbridge and Southbridge are intended to be interpreted broadly to cover various chips who functions include passing interrupt signals toward a processor. In some embodiments, MCH 910 may be integrated with processor 901. In such a configuration, chipset 902 operates as an interface chip performing some functions of MCH 910 and ICH 911, as shown in FIG. 11. Furthermore, graphics accelerator 912 may be integrated within MCH 910 or processor 901.

Memory 905 may store data including sequences of instructions that are executed by processor 901, or any other device. For example, executable code 913 and/or data 914 of a variety of operating systems, device drivers, firmware (e.g., input output basic system or BIOS), and/or applications can be loaded in memory 905 and executed by processor 901. An operating system can be any kind of operating systems, such as, for example, Windows® operating system from Microsoft®, Mac OS®/iOS® from Apple, Android® from Google®, Linux®, Unix®, or other real-time operating systems. In one embodiment, memory 905 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk or a flash storage device. Front side bus (FSB) 906 may be a multi-drop or point-to-point interconnect. The term FSB is intended to cover various types of interconnects to processor 901. Chipset 902 may communicate with other devices such as devices 903-904 via point-to-point interfaces. Bus 906 may be implemented as a variety of buses or interconnects, such as, for example, a quick path interconnect (QPI), a hyper transport interconnect, or a bus compatible with advanced microcontroller bus architecture (AMBA) such as an AMBA high-performance bus (AHB).

Cache 908 may be any kind of processor cache, such as level-1 (L1) cache, L2 cache, L3 cache, L4 cache, last-level cache (LLC), or a combination thereof. Cache 908 may be shared with processor cores 909 of processor 901. Cache 908 may be embedded within processor 901 and/or external to processor 901. Cache 908 may be shared amongst cores 909. Alternatively, at least one of cores 909 further includes its own local cache embedded therein. At least one of cores 909 may utilize both the local cache and the cache shared with another one of cores 909. Processor 901 may further include a direct cache access (DCA) logic to enable other devices such as devices 903-904 to directly access cache 908. Processor 901 and/or chipset 902 may further include an interrupt controller, such as an advanced programmable interrupt controller (APIC), to handle interrupts such as message signaled interrupts.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   receiving first code having a program loop implemented with scalar instructions to store values of a first array to a second array based on values of a third array; and
   generating second code representing the program loop with vector instructions, the second code including
      a shuffle instruction to shuffle elements of the first array based on the third array using a shuffle table in a vector manner, and
      a store instruction to store the shuffled elements of the first array in the second array using a mask store table in a vector manner.

2. The method of claim 1, wherein the second code further comprises instructions to
   compare elements of the third array with a predetermined threshold, generating a comparison result, and
   generate a mask based on the comparison result, the elements of the first array to be shuffled based on the mask.

3. The method of claim 2, wherein the second code further comprises an instruction to load elements of the shuffle table selected based on the mask, the elements of the first array to be shuffled via the shuffle instruction based on the selected elements of the shuffle table.

4. The method of claim 2, wherein the second code further comprises an instruction to load elements of the mask store table selected based on the mask, the shuffled elements of the first array to be stored via the mask store instruction based on the selected elements of the mask store table.

5. The method of claim 4, wherein the selected elements of the mask store table are determined based on a number of bits of the mask that have a predetermined logical value.

6. The method of claim 2, wherein the second code further comprises an instruction to store the predetermined threshold in a vector register, the elements of the first array to be compared with values stored in the vector register using a vector compare instruction.

7. The method of claim 2, wherein the mask is generated based on sign bits of the comparison result stored in a vector register.

8. A non-transitory computer-readable storage medium having instructions stored therein, which when executed by a computer, cause the computer to perform a method, the method comprising:
   receiving first code having a program loop implemented with scalar instructions to store values of a first array to a second array based on values of a third array; and
   generating second code representing the program loop with vector instructions, the second code including
      a shuffle instruction to shuffle elements of the first array based on the third array using a shuffle table in a vector manner, and
      a store instruction to store the shuffled elements of the first array in the second array using a mask store table in a vector manner.

9. The non-transitory computer-readable storage medium of claim 8, wherein the second code further comprises instructions to
   compare elements of the third array with a predetermined threshold, generating a comparison result, and
   generate a mask based on the comparison result, the elements of the first array to be shuffled based on the mask.

10. The non-transitory computer-readable storage medium of claim 9, wherein the second code further comprises an instruction to load elements of the shuffle table selected based on the mask, the elements of the first array to be shuffled via the shuffle instruction based on the selected elements of the shuffle table.

11. The non-transitory computer-readable storage medium of claim 9, wherein the second code further comprises an instruction to load elements of the mask store table selected based on the mask, the shuffled elements of the first array to be stored via the mask store instruction based on the selected elements of the mask store table.

12. The non-transitory computer-readable storage medium of claim 11, wherein the selected elements of the mask store table are determined based on a number of bits of the mask that have a predetermined logical value.

13. The non-transitory computer-readable storage medium of claim 9, wherein the second code further comprises an instruction to store the predetermined threshold in a vector register, the elements of the first array to be compared with values stored in the vector register using a vector compare instruction.

14. The non-transitory computer-readable storage medium of claim 9, wherein the mask is generated based on sign bits of the comparison result stored in a vector register.

15. An apparatus, comprising:
   a memory to store a shuffle table and a mask store table; and
   a code optimizer to receive first code having a program loop implemented with scalar instructions to store values of a first array to a second array based on values of a third array and to generate second code representing the program loop with vector instructions, the second code including
      a shuffle instruction to shuffle elements of the first array based on the third array using the shuffle table in a vector manner, and
      a store instruction to store the shuffled elements of the first array in the second array using the mask store table in a vector manner.

16. The apparatus of claim 15, wherein the second code further comprises instructions to
   compare elements of the third array with a predetermined threshold, generating a comparison result, and
   generate a mask based on the comparison result, the elements of the first array to be shuffled based on the mask.

17. The apparatus of claim 16, wherein the second code further comprises an instruction to load elements of the shuffle table selected based on the mask, the elements of the first array to be shuffled via the shuffle instruction based on the selected elements of the shuffle table.

18. The apparatus of claim 16, wherein the second code further comprises an instruction to load elements of the mask store table selected based on the mask, the shuffled elements of the first array to be stored via the mask store instruction based on the selected elements of the mask store table.

19. The apparatus of claim 18, wherein the selected elements of the mask store table are determined based on a number of bits of the mask that have a predetermined logical value and a mask bit is a most significant bit in each element of the mask.

20. The apparatus of claim 16, wherein the second code further comprises an instruction to store the predetermined threshold in a vector register, the elements of the first array to be compared with values stored in the vector register using a vector compare instruction.

\* \* \* \* \*